(12) United States Patent
Dorigatti et al.

(10) Patent No.: US 8,904,900 B2
(45) Date of Patent: Dec. 9, 2014

(54) ARTICULATED MECHANICAL ARM EQUIPPED WITH A PASSIVE DEVICE FOR COMPENSATION FOR GRAVITY

(71) Applicant: Trimos S.A., Renens (CH)

(72) Inventors: Luca Dorigatti, Fey (CH); Stephane Dewarrat, Morges (CH)

(73) Assignee: Trimos S.A., Renens (CH)

( * ) Notice: Subject to any disclaimer, the term of this patent is extended or adjusted under 35 U.S.C. 154(b) by 30 days.

(21) Appl. No.: 13/804,976

(22) Filed: Mar. 14, 2013

(65) Prior Publication Data
US 2013/0283958 A1    Oct. 31, 2013

(30) Foreign Application Priority Data

Apr. 30, 2012    (CH) ........................................ 0593/12

(51) Int. Cl.
*B25J 17/00*    (2006.01)
*B25J 17/02*    (2006.01)
*B25J 18/00*    (2006.01)

(52) U.S. Cl.
CPC ..... *B25J 17/00* (2013.01); *B25J 18/00* (2013.01); *B25F 19/0008* (2013.01); *Y10S 901/28* (2013.01); *Y10S 901/48* (2013.01)
USPC .............................. 74/490.01; 901/48; 901/28

(58) Field of Classification Search
CPC ... B25J 19/0004; B25J 19/0008; B25J 9/1638
USPC ............................ 74/490.01, 490.05; 901/48
See application file for complete search history.

(56) References Cited

U.S. PATENT DOCUMENTS

| | | | | |
|---|---|---|---|---|
| 4,598,601 A | * | 7/1986 | Molaug | 74/469 |
| 4,753,128 A | * | 6/1988 | Bartlett et al. | 74/469 |
| 4,803,895 A | * | 2/1989 | Nishizawa et al. | 74/603 |
| 5,220,849 A | * | 6/1993 | Lande et al. | 74/479.01 |
| 5,402,690 A | * | 4/1995 | Sekiguchi et al. | 74/490.01 |
| 5,415,057 A | * | 5/1995 | Nihei et al. | 74/490.01 |
| 6,145,403 A | | 11/2000 | Aschenbrenner et al. | |
| 7,950,710 B2 | * | 5/2011 | Matsukuma et al. | 294/104 |

FOREIGN PATENT DOCUMENTS

JP    08090484 A    4/1996

OTHER PUBLICATIONS

European Search Report, dated Jul. 12, 2013, from corresponding EP application.

* cited by examiner

*Primary Examiner* — Justin Krause
(74) *Attorney, Agent, or Firm* — Young & Thompson

(57) ABSTRACT

An articulated mechanical arm includes a passive device designed to compensate for the effects of gravity on at least a first pivot connection which articulates a first member of the arm on a second member of the arm, and constitutes a first degree of freedom of the arm. The passive device includes a drive mechanism and at least one magnetic device. The drive mechanism is designed to transmit to the magnetic device any rotation of the second member relative to the first pivot connection. The magnetic device is designed to produce torque further to the rotation of the second member. The drive mechanism and the magnetic device are also designed such that the torque is retransmitted by the drive mechanism to the first pivot connection, such that the retransmitted torque cancels the moment of force caused by gravity exerted on the articulated mechanical arm, relative to the first pivot connection.

12 Claims, 8 Drawing Sheets

ARTICULATED MECHANICAL ARM EQUIPPED WITH A PASSIVE DEVICE FOR COMPENSATION FOR GRAVITY

BACKGROUND OF THE INVENTION

The present invention relates to an articulated mechanical arm equipped with a passive device for compensation for gravity.

DESCRIPTION OF THE RELATED ART

Articulated mechanical arms are used in particular in a large number of industrial fields (cranes), in the medical field (robots) and for measurement of co-ordinates.

An articulated mechanical arm generally comprises an upper member which is articulated by one or a plurality of articulations on a base (shoulder), and on which there is articulated by one or a plurality of articulations (elbow) a forearm which may or may not be used as a support for an articulated tool holder (wrist).

Most industrial articulated mechanical arms have a configuration with six degrees of freedom. There are also anthropomorphic articulated mechanical arms with seven degrees of freedom, or more limited articulated mechanical arms with a configuration with five degrees of freedom or less. In general, each articulation of an articulated mechanical arm is a pivot connection which permits limited or unlimited rotation around an axis.

An articulated mechanical arm is subject to gravity, and in order to prevent the upper member and/or the forearm from falling, it is necessary to provide a device which makes it possible to compensate for the action of gravity on the articulations of the arm. In general, devices of this type are active, i.e. they need a supply of energy, and comprise either motors or a braking system actuated according to the position and orientation of the arm. Passive devices which do not need a source of energy exist, and comprise springs, such as in the case of office lamps of the Anglepoise (registered trademark) type, or counterweights. The active devices, such as motorised devices or braking systems, can be used on any type of articulated mechanical arm, and in particular on heavy structures. However, these active devices are in general cumbersome, which can be detrimental to the maneuverability and the precision of the articulated mechanical arm. In addition, they require a supply of energy in order to function. The known passive devices, such as devices with springs or counterweights, are not always suitable for large-sized articulated mechanical arms which are designed to carry out heavy tasks, and the more the size of the arm is increased, the more they become cumbersome, with the aforementioned disadvantages.

SUMMARY OF THE INVENTION

The object of the present invention is to provide an articulated mechanical arm equipped with a device for compensation for gravity, which is designed to compensate for the effects of gravity on at least one articulation of the articulated mechanical arm, thus eliminating the aforementioned disadvantages. In particular, the object of the present invention is to provide an articulated mechanical arm provided with a device for compensation for gravity which is passive, safe (thus preventing any untimely falling of the articulated mechanical arm, irrespective of its position or orientation), and less cumbersome than the known devices. Another object of the present invention is to provide an articulated mechanical arm provided with a device for compensation, which, as a result of its construction, makes it possible to render the said articulated mechanical arm more maneuverable, more precise, and more energy efficient, and which is suitable for a large variety of articulated mechanical arms ranging from the simpler and lighter types, to the more complex and heavy types, regardless of their usage.

The object of the present invention is an articulated mechanical arm comprising a passive device for compensation for gravity, which is designed to compensate for the effects of gravity on at least a first pivot connection which articulates a first member of the said arm on a second member of the said arm, and constitutes a first degree of freedom of the said arm, characterised in that the said passive device for compensation for gravity comprises a drive mechanism and at least one magnetic device, the drive mechanism being designed to transmit to the magnetic device any rotation of the second member relative to the said first pivot connection, the magnetic device being designed to produce torque further to the said rotation of the second member, the drive mechanism and the magnetic device also being designed such that the said torque is retransmitted by the drive mechanism to the first pivot connection, such that the said retransmitted torque cancels the moment of force caused by the gravity which is exerted on the articulated mechanical arm, relative to the said first pivot connection.

The object of the invention is thus an articulated mechanical arm provided with a device which is designed to compensate for the torques caused by gravity exerted on at least one articulation of the arm.

According to a preferred embodiment, the device according to the invention is situated in the upper arm of the articulated mechanical arm, preferably as close as possible to the pivot connection(s) which articulate(s) the said upper arm on the base of the articulated mechanical arm. The device is driven by drive shafts which make it possible to reproduce as faithfully as possible the orientation of the forearm, by rotation of the pivot connection(s) between the upper arm and the forearm, and of the pivot connection(s) between the base of the articulated mechanical arm and the upper arm.

As will be described in detail hereinafter, the device comprises gears and magnetic devices constituted by magnets, which generate torques designed to compensate for the effects of gravity on one or a plurality of articulations of the arm. The said magnetic devices take into account the position and orientation of the upper arm and the forearm relative to a position of rest, they are charged, and return mechanical torques to the articulation system of the articulated mechanical arm, in order to compensate fully for the torques caused by gravity.

In particular, the device according to the invention is sufficient to compensate for all the effects of gravity on one or a plurality of articulations of the articulated mechanical arm, without needing another device for passive compensation by means of a counterweight, or an active device using motors or brakes. It will be appreciated that the articulated mechanical arm can comprise another known device for compensation in addition to the device for compensation according to the invention, described hereinafter.

BRIEF DESCRIPTION OF THE DRAWING FIGURES

The appended figures illustrate schematically and solely by way of example an embodiment of an articulated mechanical arm equipped with a passive device for compensation for gravity according to the invention.

DETAILED DESCRIPTION OF THE INVENTION

Figure 1:
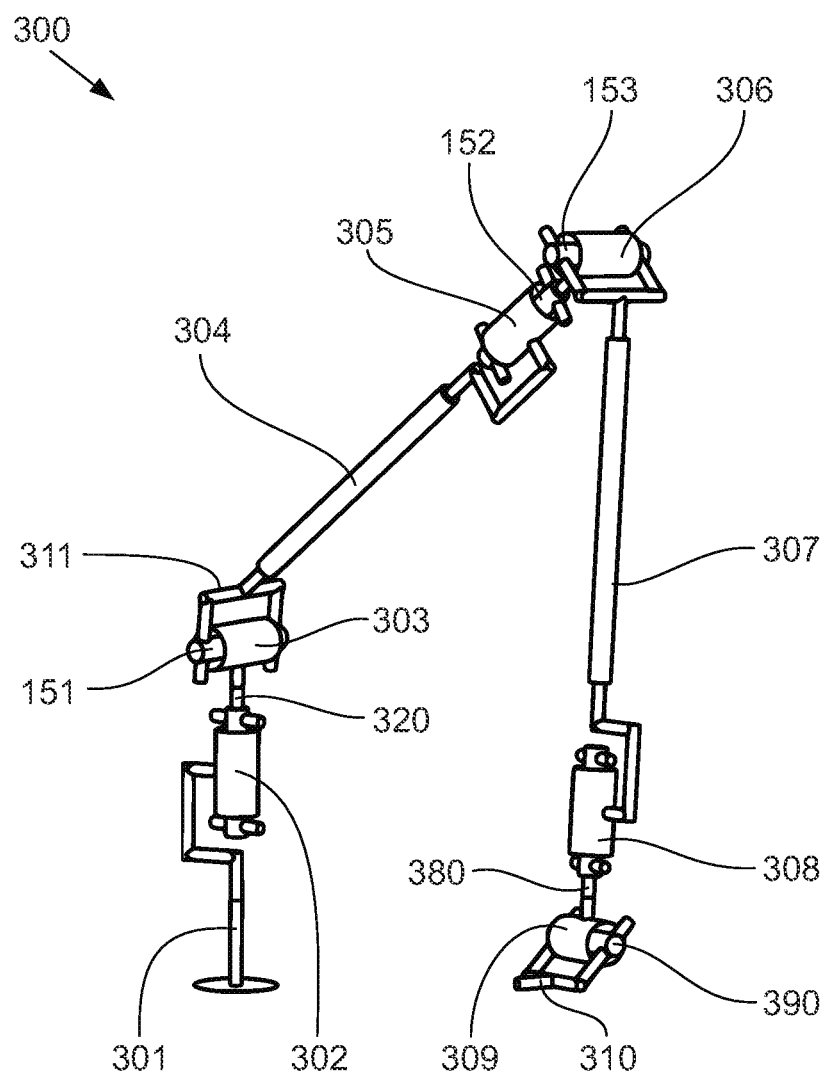
FIG. 1 illustrates an articulated mechanical arm equipped with a passive device for compensation for gravity according to the invention.

An embodiment of the passive device for compensation for gravity for an articulated mechanical arm according to the invention will now be described in detail with reference to the figures. In this embodiment, the device for compensation for gravity equips an articulated mechanical arm 300 which is illustrated in FIG. 1.

The articulated mechanical arm 300 is arranged on a base 301 which is secured to an external rigid support, such as for example the ground or the ceiling, or any other appropriate surface. An upper arm 304 is articulated by one of its ends on the base 301 by means of a first pivot connection 302 and a second pivot connection 303. The first pivot connection 302 permits the rotation of a first (physical) shaft 320 around its longitudinal axis. The said longitudinal axis thus defines the (imaginary) axis of rotation of the first pivot connection 302, which will be designated as the first axis of rotation 320$i$ hereinafter. The second pivot connection 303 permits the rotation of a second (physical) shaft 151 around its longitudinal axis, which thus defines the (imaginary) axis of rotation of the second pivot connection 303, which will be designated as the second axis of rotation 151$i$ hereinafter. The second shaft 151, and consequently the second axis of rotation 151$i$ of the second pivot connection 303 is substantially perpendicular to the first shaft 320 (and to the first axis of rotation 320$i$) of the first pivot connection 302.

A forearm 307 is articulated on the upper arm 304 by means of a third pivot connection 305 and a fourth pivot connection 306. The third pivot connection 305 permits the rotation of a third (physical) shaft 152 around its longitudinal axis, which thus defines the (imaginary) axis of rotation of the third pivot connection 305, which will be designated as the third axis of rotation 152$i$ hereinafter. The fourth pivot connection 306 permits the rotation of a fourth (physical) shaft 153 around its longitudinal axis, which thus defines the (imaginary) axis of rotation of the fourth pivot connection 306, which will be designated as the fourth axis of rotation 153$i$ hereinafter. Preferably, the third shaft 152, and consequently the third axis of rotation 152$i$ of the third pivot connection 305, is substantially parallel to the longitudinal axis of the upper arm 304. In the embodiment illustrated, the said third axis of rotation 152$i$ coincides with the longitudinal axis of the upper arm 304. The fourth shaft 153, and consequently the fourth axis of rotation 153$i$ of the fourth pivot connection 306 is substantially orthogonal to the third shaft 152 of the third pivot connection 305. In addition, the second shaft 151, and consequently the second axis of rotation 151$i$ of the second pivot connection 303 is substantially perpendicular to the third shaft 152, and consequently to the third axis of rotation 152$i$.

A tool holder 310 can also be articulated on the forearm 307, for example by means of a fifth pivot connection 308, the axis of rotation 380 of which substantially coincides with the longitudinal axis of the forearm 307, and a sixth pivot connection 309, the axis of rotation 390 of which is substantially orthogonal to the axis of rotation 380 of the fifth pivot connection. The tool holder 310 forms the "hand" of the articulated mechanical arm 300 and is designed to receive a tool such as a gripper, a measurement instrument, or any other tool appropriate for the use of the articulated mechanical arm 300.

Hereinafter, it is considered that the first shaft 320 and the first axis of rotation 320$i$ of the first pivot connection 302 are vertical. In the embodiment illustrated in FIG. 1, the third axis of rotation 152$i$ (coinciding with the longitudinal axis of the upper arm 304), and the second axis of rotation 151$i$ of the second pivot connection 303 do not intersect, the upper arm 304 being secured to the second pivot connection 303 by means of a fork 311 which forms a fixed angle with the said second axis of rotation 151$i$ of the said second pivot connection 303. Persons skilled in the art will appreciate that this angle can be adjusted for ergonomic reasons and for the appearance of the articulated mechanical arm 300, and that, as a variant, the said second axis of rotation 151$i$ of the second pivot connection 303 and the longitudinal axis of the upper arm 304 could intersect. This same reasoning applies to the third axis of rotation 153$i$ and to the longitudinal axis of the forearm 307, which may or may not intersect.

Figure 2:
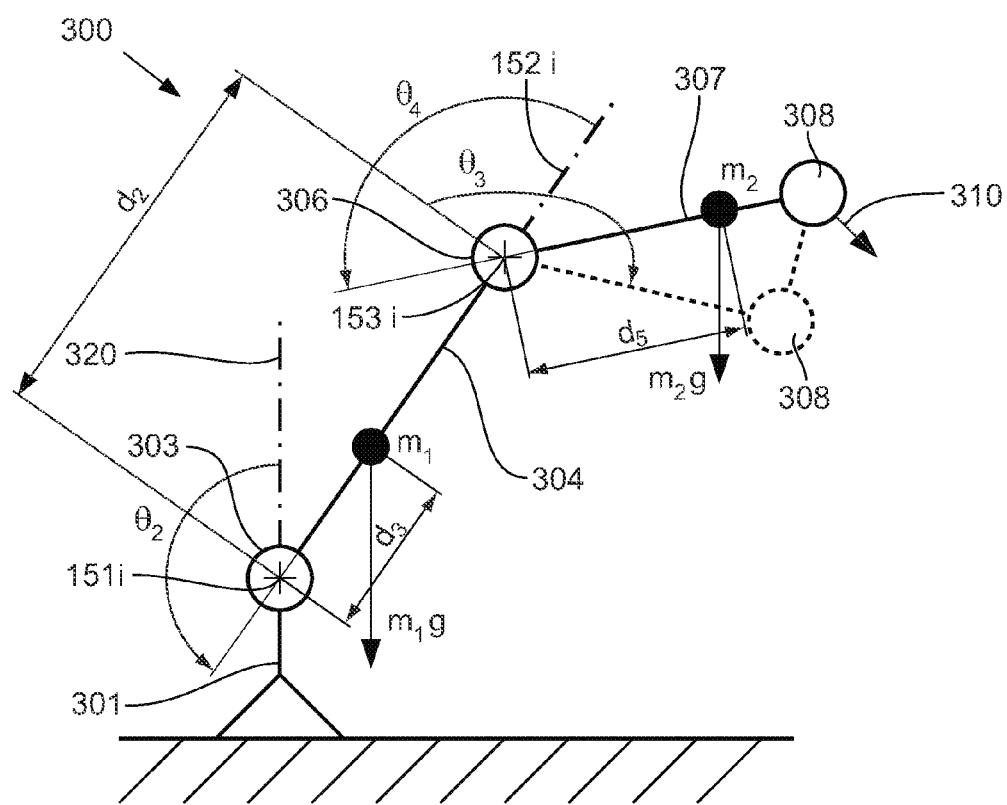
FIGS. 2, 3 and 4 are simplified schematic representations of the articulated mechanical arm illustrated in FIG. 1, showing the forces which are exerted on the said arm, and the systems of axes of the pivot connections of the said arm.
Figure 3:
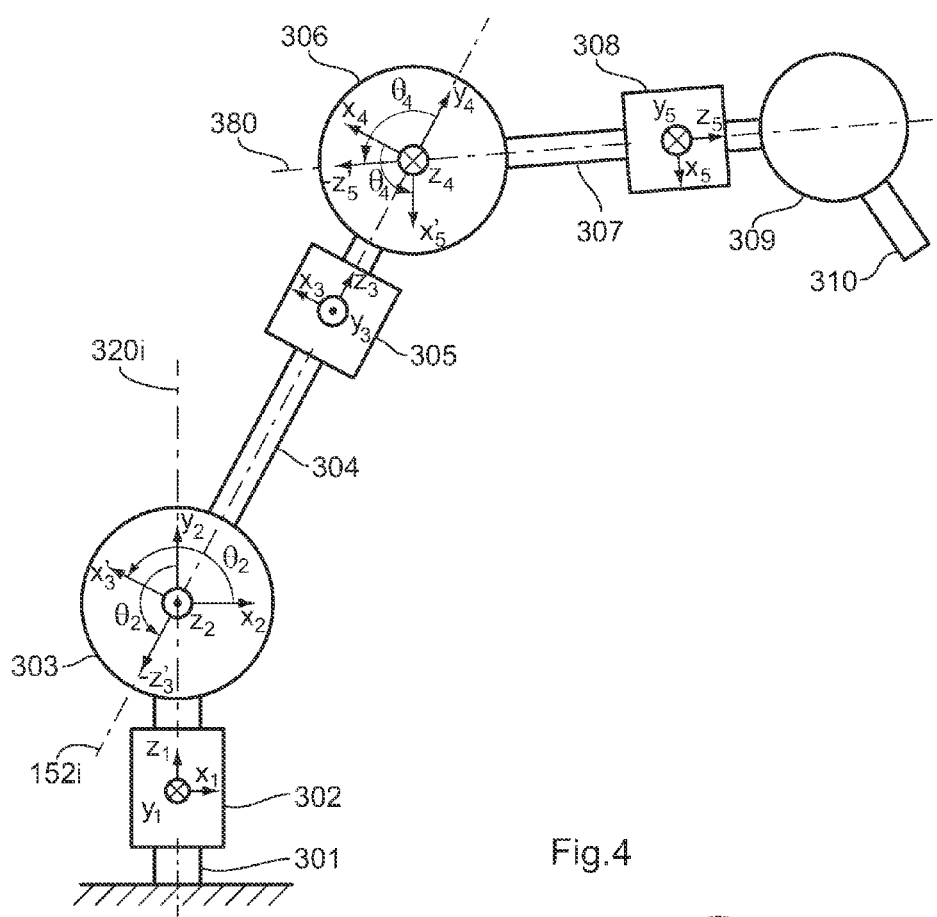
Figure 4:
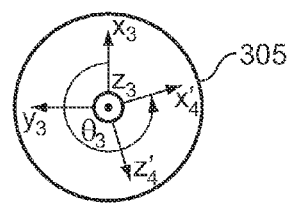

It will be clearly apparent hereinafter that the fact of whether or not the second axis of rotation 151$i$ of the second pivot connection 303 and the longitudinal axis of the upper arm 304 intersect does not have any influence on the present invention. In particular, FIGS. 2, 3 and 4 illustrate schematically an articulated mechanical arm 300 wherein the said axes intersect, and the following theoretical discussion on the forces which are exerted on the said arm is immediately applicable to the case in which some of the axes of rotation of the system do not intersect.

Each pivot connection 302, 303, 305, 306, 308, 309 of the articulated mechanical arm 300 provides a degree of freedom for the said arm, which thus has six of them in this embodiment. The pivot connections 302, 303, 305, 306, 308, 309 are devices which are known to persons skilled in the art, and will not be described in greater detail here. In particular, they can be produced with rotary guides or bearings which permit the rotation of their respective axis in an appropriate receptacle. Also in a known manner, the pivot connections are connected in series to the upper arm 304 and the forearm 307 by appropriate rigid mechanical elements, such as the fork 311 for example.

The articulated mechanical arm 300 has been described above by way of example. In particular, it will become clearly apparent hereinafter that the present invention is not limited to the arrangement of the articulated mechanical arm described above with reference to the figures.

The device for compensation for gravity 150 according to the present embodiment is designed to compensate for the torques caused by gravity exerted on the second, third and fourth shafts 151, 152, 153 of the second third and fourth pivot connections 303, 305, 306 respectively. The said torques are thus determined.

FIGS. 2, 3 and 4 illustrate schematically the articulated mechanical arm 300 and the pivot connections which constitute it, as well as the systems of axes concerned. These schematic representations will make it possible to calculate the torques or moments of force which are caused by gravity and are exerted on the second, third and fourth shafts 151, 152, 153 of the second, third and fourth pivot connections 303, 305, 306 respectively, according to the rotation of the upper arm 304 and the forearm 307 relative to the said pivot connections.

The Denavit-Hartenberg convention used in robotics has been applied in order to determine the reference system for each pivot connection.

In the figures, a circle with a dot in the middle indicates a vector perpendicular to the plane of the page, and pointing towards the reader, whereas a circle with a cross in the middle indicates a vector perpendicular to the plane of the page, and moving away from the reader.

The unit vectors which define an orthonormal reference for each of the first, second, third, fourth and fifth pivot connections 302, 303, 305, 306, 308 have thus been selected as follows:

The vectors $z_n$ are selected on the axis of rotation of each of the pivot connections, for n going from 1 to 5;

The vectors $x_n$ are parallel to the normal line common to the vectors $z_{n-1}$, and $z_n$, i.e. $x_n = z_{n-1} \hat{} z_n$, for n going from 2 to 5:

The vectors $y_n$ are selected such that the vectors $x_n$, $y_n$ and $z_n$ form a direct orthonormal reference (rule of the corkscrew or right hand) for n going from 1 to 5.

This therefore provides the following, as illustrated in FIG. 3:

The vector $z_1$ is directed according to the first axis of rotation 320$i$ of the first pivot connection 302, the vector $z_2$ is directed according to the second axis of rotation 151$i$ of the second pivot connection 303, the vector $z_3$ is directed according to the third axis of rotation 152$i$ (in this case coinciding with the longitudinal axis of the upper arm 304) of the third pivot connection 305, the vector $z_4$ is directed according to the fourth axis of rotation 153$i$ of the fourth pivot connection 306, and the vector $z_5$ is directed according to the axis of rotation of the fifth pivot connection 308, which in this case coincides with the longitudinal axis of the forearm 307.

The following pairs of vectors designate vectors which are substantially at right angles to one another: $z_1$ and $z_2$, $z_2$ and $z_3$, $z_3$ and $z_4$, $z_4$ and $z_5$.

The following pairs of vectors designate vectors which are substantially parallel to one another: $y_1$ and $z_2$, $y_2$ and $z_3$, $y_3$ and $z_4$, $y_4$ and $z_5$.

Again according to the Denavit-Hartenberg convention, $\theta_n$ designates the angle oriented around the vector $z_n$ between the vectors $x_{n+1}$ and $x_{n+1}$. $x'_n$ or $y'_n$ or $z'_n$ designate the vectors transposed to $x_n$ or $y_n$ or $z_n$ respectively. The – sign is used to designate the opposite vector.

In particular the following angles are taken into consideration:

The angle $\theta_2$ designates the angle oriented in the positive direction around the vector $z_2$ between the vector $x_2$ and the transposed vector $x_3'$. This angle $\theta_2$ is equal to the angle oriented in the positive direction around the vector $z_2$ between the vector $y_2$ and the transposed vector opposite $z_3$, known as $-z_3'$. This is therefore the angle oriented between the first axis of rotation 320$i$ of the first pivot connection 302 (which has been assumed to be vertical), and the third axis of rotation 152$i$, which in this case coincides with the longitudinal axis of the upper arm 304. This angle $\theta_2$ thus determines the rotation of the upper arm 304 relative to the second pivot connection 303.

The angle $\theta_3$ designates the angle oriented in the positive direction around the vector $z_3$ between the vector $x_3$ and the transposed vector $x_4'$. This angle $\theta_3$ thus determines the rotation of the forearm 307 relative to the third pivot connection 305 (see FIG. 4 for an illustration of this angle on a plane perpendicular to the vector $z_3$ and containing the vectors $z_4$ and $x_4$).

The angle $\theta_4$ designates the angle oriented in the positive direction around the vector $z_4$ between the vector $x_4$ and the transposed vector $x_5'$. This angle $\theta_4$ is equal to the angle oriented in the positive direction around $z_4$ between the vector $y_4$ and the transposed vector opposite the vector $z_5$, known as $-z_5'$. This is therefore the angle oriented between the third axis of rotation 152$i$ of the third pivot connection 305 and the longitudinal axis of the forearm 307 considered on the plane only determined perpendicular to the fourth axis of rotation 153$i$ of the fourth pivot connection 306, and containing the third axis of rotation 152$i$ of the third pivot connection 305 and the longitudinal axis of the forearm 307 (coinciding with the axis of rotation 380 of the fifth pivot connection 308). This angle $\theta_4$ thus determines the rotation of the forearm 307 relative to the fourth pivot connection 306.

FIG. 2 illustrates schematically the articulated mechanical arm 300 and the forces which are exerted on the upper arm 304 and the forearm 307.

A first mass $m_1$ represents the total mass of the upper arm 304 and of the third and fourth pivot connections 305 and 306, whereas a second mass $m_2$ represents the total mass of the forearm 307, of the fifth and six pivot connections 308, 309, and of the tool holder 310.

The following distances are taken into consideration:

The distance $d_2$ is the distance according to the third axis of rotation 152$i$ (or according to the vector $z_3$) between the second axis of rotation 151$i$ of the second pivot connection 303 and the fourth axis of rotation 153$i$ of the fourth pivot connection 306.

The distance $d_3$ is the distance according to the third axis of rotation 152$i$ (or according to the vector $z_3$) between the second axis of rotation 151$i$ of the second pivot connection 303 and the first mass $m_1$. Since the first mass $m_1$ comprises in addition to the upper arm 304 the mass of the third and fourth pivot connections 305, 306, its position can be offset relative to the centre of gravity of the upper arm 304.

The distance $d_5$ is the distance according to the longitudinal axis of the forearm 307 (or according to the vector $z_5$) between the fourth axis of rotation 153$i$ of the fourth pivot connection 306 and the mass $m_2$. In this case also, in this embodiment, since the second mass $m_2$ comprises the masses of the forearm 307, of the fifth and six pivot connections 308, 309, and of the tool holder 310, its position can be offset relative to the centre of gravity of the forearm 307.

In the embodiment illustrated, in order to simplify the calculations, the fifth and sixth (and optionally, as a variant, the seventh) pivot connections 308 and 309 are designed such that their rotations do not modify substantially the location of the centre of gravity of the mass $m_2$ relative to the forearm 307 and to the fourth pivot connection 306. For this purpose, the centre of gravity of the tool holder 310 and of the fifth and sixth pivot connections 308 and 309 is as close as possible to the axis 380 of the fifth pivot connection 308. Thus, in this embodiment, the moments of force exerted by the masses $m_1$ and $m_2$ on the second, third and fourth pivot connections 303, 305, 306 are not dependent on the said rotations of the articulated mechanical arm relative to the fifth and sixth (and optionally the seventh) pivot connections 308, 309, and the calculations are simplified accordingly.

By means of these variables and the above hypothesis concerning the fourth and fifth pivot connections 308, 309, it is possible to determine the moment of force caused by the gravity exerted by the first and second masses $m_1$, $m_2$ on the second axis 151 of the second pivot connection 303, and in particular the component of this moment relative to the vector $z_2$:

$$M_{(303,z2)}(\theta_2,\theta_3,\theta_4) = -g(m_2 d_5(\cos\theta_2 \cos\theta_3 \sin\theta_4 + \sin\theta_2 \cos\theta_4) + (m_1 d_3 + m_2 d_2)\sin\theta_2).$$

By trigonometric simplification of the multiplier member of $gm_2 d_5$, the following is obtained:

$$M_{(303,z2)}(\theta_2,\theta_3,\theta_4) = gm_2 d_5[\sin(\theta_4+\theta_3\theta_2) + \sin(\theta_4+\theta_3-\theta_2) + \sin(\theta_4-\theta_3+\theta_2) + \sin(\theta_4-\theta_3-\theta_2) + 2\sin(\theta_4+\theta_2) - 2\sin(\theta_4-\theta_2)]/4 + g(m_1 d_3 + m_2 d_2)\sin\theta_2$$

This equation for the above moment $M_{(303,z2)}$ determines the torques exerted by the gravity caused by the upper arm 304 on the articulation 303.

There is also determination of the moment of force caused by the gravity exerted by the second mass $m_2$ on the third shaft 152 of the third pivot connection 305, and in particular the component of this moment relative to the vector $z_3$:

$$M_{(305,z3)}(\theta_2,\theta_3,\theta_4) = gm_2 d_5(\sin\theta_2 \sin\theta_3 \sin\theta_4)$$

By trigonometric simplification of the multiplier member of $gm_2 d_5$, the following is obtained:

$$M_{(305,z3)}(\theta_2,\theta_3,\theta_4) = -gm_2 d_5[\sin(\theta_4+\theta_3+\theta_2) - \sin(\theta_4+\theta_3-\theta_2) - \sin(\theta_4-\theta_3+\theta_2) + \sin(\theta_4-\theta_3\theta_2)]/4$$

Finally, there is determination of the moment of force caused by the gravity exerted by the second mass $m_2$ on the fourth shaft 153 of the fourth pivot connection 306, and in particular the component of this moment relative to the vector $z_4$:

$$M_{(306,z4)}(\theta_2,\theta_3,\theta_4) = -gm_2 d_5(\cos\theta_2 \sin\theta_4 + \sin\theta_2 \cos\theta_3 \cos\theta_4)$$

By simplifying the multiplier member of $gm_2 d_5$, the following is obtained:

$$M_{(306,z2)}(\theta_2,\theta_3,\theta_4) = -gm_2 d_5[\sin(\theta_4+\theta_3+\theta_2) - \sin(\theta_4+\theta_3-\theta_2) + \sin(\theta_4-\theta_3+\theta_2) - \sin(\theta_4-\theta_3-\theta_2) + 2\sin(\theta_4+\theta_2) + 2\sin(\theta_4-\theta_2)]/4$$

The device for compensation for gravity 150 according to the present embodiment is designed to exert on each of the second, third and fourth shafts 151, 152, 153 of the second, third and fourth pivot connections 303, 305, 306 a counter-torque which is designed to cancel the moment of force caused by the gravity which is exerted on each of the said shafts as calculated above, irrespective of the rotation of the upper arm 304 and/or the forearm 307 relative to the said pivot connections (i.e. irrespective of the values of the angles $\theta_2$, $\theta_3$, $\theta_4$, the rotations of the articulated mechanical arm 300 around the fifth and sixth pivot connections 308, 309 not being taken into account in this embodiment). Thus, by means of these counter-torques generated by the device for compensation 150 according to the invention, for each of the second, third and fourth shafts 151, 152, 153 of the second, third and fourth pivot connections 303, 305, 306, the sum of the moments of force exerted on the said shaft is zero. The equilibrium is maintained for each of the second, third and fourth pivot connections 303, 305, 306, and any falling of the forearm 307 or of the upper arm 304 relative to these connections, caused by gravity, is prevented.

According to the present embodiment, the device according to the invention is thus designed to exert on the second shaft 151 the following counter-torque in order to compensate for the effects of gravity on this shaft:

$$C_{303} = [gm_2 d_5 \sin(\theta_4+\theta_3+\theta_2) + gm_2 d_5 \sin(\theta_4+\theta_3-\theta_2) + gm_2 d_5 \sin(\theta_4-\theta_3+\theta_2) + gm_2 d_5 \sin(\theta_4-\theta_3-\theta_2) + 2gm_2 d_5 \sin(\theta_4+\theta_2) - 2gm_2 d_5 \sin(\theta_4-\theta_2)]/4$$

this counter-torque being determined by means of the moment $M_{(303,z2)}$ calculated above.

It should be noted that the member $(m_1 d_3 + d_2 m_2)\sin\theta_2$ in the above equation of the moment $M_{(303,z2)}$ characterises the effects of the gravity which is exerted on the second shaft 151 caused substantially by the upper arm 304. These effects are not compensated for by the device according to this embodiment (hence the above counter-torque $C_{303}$ obtained), but can be compensated for by any other appropriate device, and in particular by a suitable device according to the invention.

Similarly, the device for compensation 150 is designed to exert on the third and fourth shafts 152, 153 the following counter-torques in order to compensate for the effects of gravity on these shafts:

$$C_{305} = [gm_2 d_5 \sin(\theta_4+\theta_3+\theta_2) - gm_2 d_5 \sin(\theta_4+\theta_3-\theta_2) - gm_2 d_5 \sin(\theta_4-\theta_3+\theta_2) + gm_2 d_5 \sin(\theta_4-\theta_3-\theta_2)]/4$$

and $$C_{306} = [gm_2 d_5 \sin(\theta_4+\theta_3+\theta_2) - gm_2 d_5 \sin(\theta_4+\theta_3-\theta_2) + gm_2 d_5 \sin(\theta_4-\theta_3+\theta_2) - gm_2 d_5 \sin(\theta_4-\theta_3-\theta_2) + 2gm_2 d_5 \sin(\theta_4+\theta_2) + 2gm_2 d_5 \sin(\theta_4-\theta_2)]/4$$

respectively, determined by means of the moments of force $M_{(305,z3)}$, $M_{(306,z4)}$ calculated above.

For this purpose, the device for compensation according to the present embodiment comprises in particular six magnetic devices which are actuated by the movements of the upper arm 304 and the forearm 307 around the second, third and fourth shafts 151, 152, 153, and which can each generate a precise torque, as well as a transmission system which makes it possible to add these torques together in order to obtain the counter-torques $C_{303}$, $C_{305}$ and $C_{306}$ calculated above, and to transmit them to each of the second, third and fourth shafts 151, 152, 153. The minimum number of magnetic devices necessary in order to generate the counter-torques $C_{303}$. $C_{305}$ and $C_{306}$ calculated above corresponds to the number of different sine terms which constitute the said counter-torques, and which is equal to 6 in this embodiment, each of the said magnetic devices being designed to generate a torque corresponding to one of the said sine terms.

The device for compensation for gravity 150 according to the embodiment illustrated will now be described in detail with reference to FIGS. 5 to 11.

The device for compensation for gravity 150 according to the embodiment illustrated is arranged in the upper arm 304, preferably as far upstream as possible, i.e. as close as possible to the second pivot connection 303, in order to reduce as far as possible the torques generated by gravity, by reducing the distance $d_3$. The device for compensation 150 according to the present embodiment takes into account the rotations carried out by the second pivot connection 303 situated upstream from the device, and by the third and fourth pivot connections 305 and 306 situated downstream from the device, i.e. the device takes as parameters the angles $\theta_2$, $\theta_3$ and $\theta_4$.

The device for compensation 150 is accommodated in a support 110 which forms part of the upper arm 304. The support 110 can be secured by any appropriate means on the upper arm 304. In the embodiment illustrated, the support 110 is a cylinder. Alternatively, the support 110 can have any appropriate form.

Figure 5:
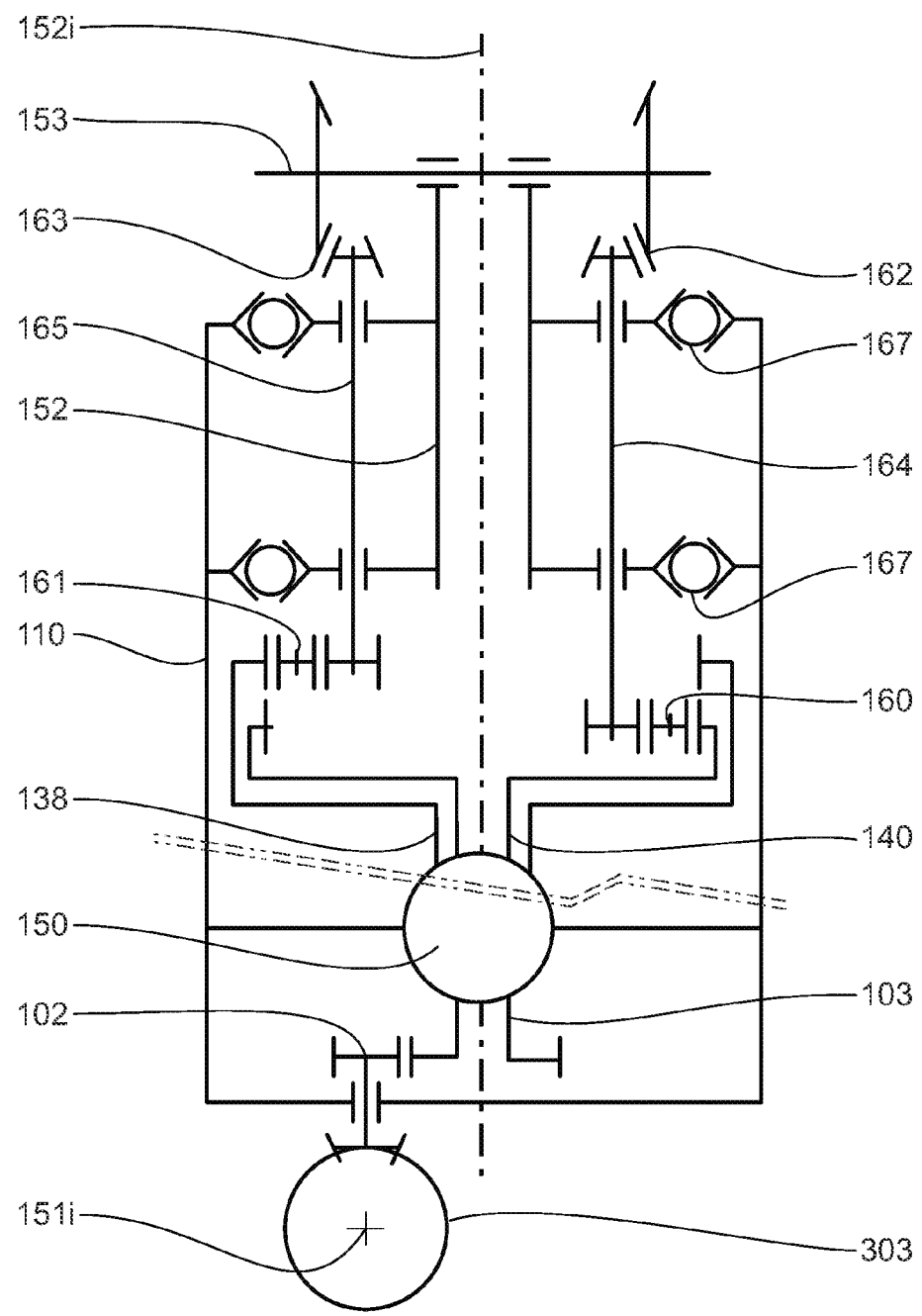
FIG. 5 illustrates schematically the mechanism for transmission of the movements of the articulated mechanical arm in FIG. 1 to the passive device for compensation according to the invention.

The movements of the articulated mechanical arm 300 relative to the second, third and fourth shafts 151, 152 and 153 of the second, third and fourth pivot connections 303, 305, 306 respectively, are transmitted to the device for compensation 150 according to the invention by means of a device for transmission described hereinafter with reference to FIG. 5 in particular.

The third pivot connection 305 is configured to permit rotation of the third shaft 152 relative to the support 110 of the device for compensation 150. For this purpose, the third pivot connection 305 can for example comprise rotary guides 167 illustrated in FIG. 5, which are arranged in the upper arm 304, and make it possible to make the third shaft 152 of the said third pivot connection 305 pivot relative to the upper arm 304 and relative to the support 110 of the device for compensation 150. In addition, the third and fourth pivot connections 305, 306 are arranged in series, such that, as illustrated in FIGS. 1 to 3, the third shaft 152 of the third pivot connection 305 is secured by one of its ends to the fourth shaft 153 of the fourth pivot connection 306, substantially perpendicularly to the said fourth shaft 153.

The movements of the articulated mechanical arm 300 around the second shaft 151 of the second pivot connection 303 (movements characterised by the oriented angle $\theta_2$) are transmitted by a first transmission gear 102 to a first drive shaft 103 which itself drives the passive device for compensation 150. It will be appreciated that any type of appropriate transmission element can constitute the first transmission gear 102, which will not be described in greater detail here. In particular, the first transmission gear 102 can be placed in any suitable place on the first drive shaft 103. If necessary, the first transmission gear 102 can be doubled or multiplied according to the length of the first drive shaft 103 and the place where this shaft 103 can easily be driven. In the embodiment illustrated, the multiplication ratio between the second pivot connection 303 and the first drive shaft is one. It will be appreciated that, as a variant, the said multiplication ratio could be an integer different from one.

The movements of the forearm 307 around the third and fourth shafts 152 and 153 of the third and fourth pivot connections 305, 306, characterised respectively by the oriented angles $\theta_3$ and $\theta_4$, are transmitted to the passive device for compensation 150 by means of two distinct drive mechanisms, one of which represents the addition of the movements of the forearm 307 around the third shaft 152 and the movements of the forearm 307 around the fourth shaft 153, whereas the other represents the subtraction of the said movements.

The movement around the third shaft 152 of the third pivot connection 305 subtracted from the movement around the fourth shaft 153 of the fourth pivot connection 306 is transmitted to a fourth drive shaft 164 by a first drive wheel 162 engaged with the fourth shaft 153. The fourth drive shaft 164 drives a second transmission gear 160 engaged with a second drive shaft 140, which itself drives the passive device for compensation 150. The second transmission gear 160 is optional. In the embodiment illustrated, this second transmission gear 160 makes it possible to solve the inter-axis problems between the first and fourth drive shafts 130, 164.

For its part, the added movement of the third and fourth shafts 152, 153 of the third and fourth pivot connections 305, 306 is transmitted to a fifth drive shaft 165, by a second drive wheel 163 engaged with the fourth shaft 153. The fifth drive shaft 165 drives a third transmission gear 161 engaged with a third drive shaft 138, which also drives the passive device for compensation 150. The third transmission gear 161 is similar to the second transmission gear 160, and is necessary only if the second transmission gear 160 is present.

The first and second drive wheels 162, 163 are engaged with the fourth shaft 153, for example by means of bevel gears, the position of which determines whether the movements are added or subtracted.

The drive device (102, 103, 160, 161, 162, 163, 164, 165, 140, 138) which transmits the movements of the articulated mechanical arm 300 around the second, third and fourth shafts 151, 152, 153 of the second, third and fourth pivot connections 303, 305, 306 respectively, has been described above purely by way of example. Any other mechanical drive means which provides sufficient strength for the necessary application could be used, for example a drive device with cables or belts.

Thus, the first, second and third drive shafts 103, 140 and 138 drive the device for compensation for gravity 150 according to the invention:

The first drive shaft 103 transmits to the device for compensation 150 any movement of the articulated mechanical arm around the second pivot connection 303, and thus the value of the angle $\theta_2$ which characterises the said movements;

The second drive shaft 140 transmits to the device for compensation 150 the subtraction of any movement of the forearm 307 around the third and fourth pivot connections 305, 306, which corresponds to the subtraction of the angles $\theta_3$ and $\theta_4$;

The third drive shaft 138 transmits to the device 150 the addition of any movement of the forearm 307 around the third and fourth pivot connections 305, 306, which corresponds to the addition of the angles $\theta_3$ and $\theta_4$.

In this embodiment, the passive device for compensation for gravity 150 therefore takes as input the following three parameters:

$$\theta_2, \theta_3-\theta_4, \theta_3+\theta_4$$

transmitted respectively by the first, second and third drive shafts 103, 140, 138.

Preferably, the first, second and third drive shafts 103, 140 and 138 and the upper arm 304 are coaxial, and their axis of rotation coincides with the third axis of rotation 152$i$ and thus with the longitudinal axis of the upper arm 304. The third axis of rotation 152$i$ is the main axis of rotation of the device for compensation 150 according to the present embodiment.

It is apparent to persons skilled in the art that, as a variant, the first, second and third drive shafts 103, 140 and 138 may not be coaxial, and their axis of rotation may not coincide with the third axis of rotation 152$i$, but be offset, whilst remaining substantially parallel to the said third axis.

In the illustrated embodiment, the first drive shaft 103 is for example supported in the support 110 of the device 150 by rotary guides 168. The second drive shaft 140 is fitted such as to pivot in the third drive shaft 138, which for its part is pivoted in the first drive shaft 103. The first drive shaft 103 is thus hollow in this embodiment. The second drive shaft 140 can for its part be hollow or solid in this embodiment. The first drive shaft 103 can be produced in a plurality of mechanical parts rendered integral with one another, such that the rigidity of the assembly is sufficient.

In the illustrated embodiment, the first, second and third drive shafts and the support 110 are concentric. The arrangement of the rotary guides or bearings necessary to support the said shafts with respect to each other and in the support 110 is not described here, but will be immediately apparent to persons skilled in the art.

The device for compensation 150 according to the present embodiment also comprises six magnetic devices 1 to 6.

The first magnetic device 1 is constituted by an outer stator 106 which is secured integrally by any appropriate means on the support 110, and surrounds an inner rotor 105, the said inner rotor being free in rotation relative to the said outer stator.

The second magnetic device 2 is constituted by an outer rotor 111, which is secured integrally on the first drive shaft 103, and surrounds an inner rotor 112 which is secured integrally on the second drive shaft 140, the said inner and outer rotors 112, 111 being free in rotation relative to one another.

The third magnetic device 3 is constituted by an outer stator 113, which is secured integrally by any appropriate means on the support 110, and surrounds an inner rotor 114, the said rotor being free in rotation relative to the said stator.

The fourth magnetic device 4 is constituted by an outer rotor 115, which is secured integrally on the first drive shaft 103, and surrounds an inner rotor 116, the said inner and outer rotors 116, 115 being free in rotation relative to one another.

The fifth magnetic device 5 is constituted by an outer rotor 117, which is secured integrally on the first drive shaft 103, and surrounds an inner rotor 118 which is secured integrally on the third drive shaft 138, the said inner and outer rotors 118, 117 being free in rotation relative to one another.

The sixth magnetic device 6 is constituted by an outer stator 119, which is secured integrally by any appropriate means on the support 110, and surrounds an inner rotor 120, the said rotor being free in rotation relative to the said stator.

In the embodiment illustrated, the six magnetic devices 1 to 6 are coaxial to the first, second and third drive shafts 103, 140, 138, and consequently to the third axis of rotation 152$i$.

Each magnetic device 1 to 6 is designed such that, further to the rotation of the inner rotor relative to the outer rotor or stator by a certain angle $t_i$ a, where $t_i$ is a non-zero rational coefficient for i=1 to 6, the return of the inner rotor to its position of rest relative to the outer rotor or stator generates torque, the function of which is a regular sinusoid with the form $$G_i \sin(a)$$

where $G_i$ is a non-zero real coefficient which is dependent on the size and physical properties of the magnetic device, for i=1 to 6.

The arrangement of the magnetic devices 1 to 6 according to the present embodiment is described in detail hereinafter with reference to FIGS. 8 and 9. It will be clearly apparent from reading this detailed description that other appropriate arrangements are possible.

Figure 8:
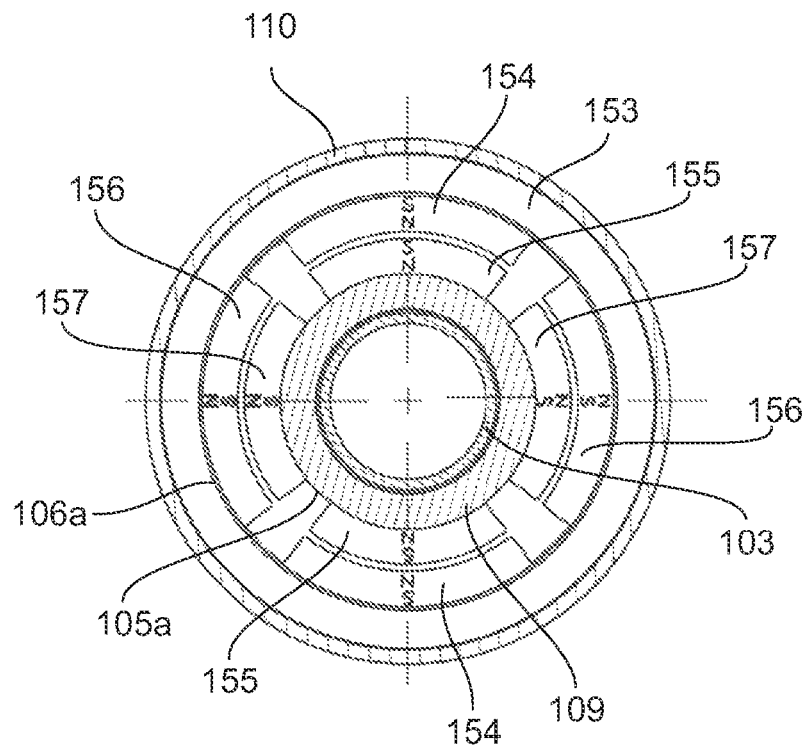
FIGS. 8 and 9 are views in cross-section according to an axis perpendicular to the axis 152$i$ of the device for compensation illustrated in FIG. 6, illustrating the arrangement of the magnetic devices.

FIG. 8 illustrates in detail the first magnetic device 1, seen in cross-section according to a plane perpendicular to the axis of rotation 152$i$. The arrangement of the third and sixth magnetic devices 3 and 6 is similar to that of the first magnetic device 1, and will therefore not be described in detail here.

In the embodiment illustrated, the inner rotor 105 of the first magnetic device 1 is constituted by an inner tubular envelope 105$a$, on which a first magnetic element is secured. In the embodiment illustrated, the said first magnetic element is formed by a first and a second pair of small plates 155, 157, which are secured by any appropriate means on the outer surface of the inner tubular envelope 105$a$.

The first and second pairs of small plates 155, 157 are permanent magnets made of an appropriate material. The two small plates of the first pair of small plates 155 are arranged such as to be diametrically opposite one another, as are the two small plates of the second pair of small plates 157. Preferably, and as illustrated in FIG. 8, the small plates 155, 157 are placed alternately on the inner tubular envelope 105$a$ and at an interval of 90° from one another. In addition, the small plates of the first pair of small plates 155 are oriented such that their north pole N is situated against the inner tubular envelope 105$a$, whereas the small plates of the second pair of small plates 157 are oriented in the opposite manner, with their south pole S being situated against the inner tubular envelope 105$a$.

Similarly, the outer stator 106 of the first magnetic device 1 is constituted by an outer tubular envelope 106$a$ on which a second magnetic element is secured by any appropriate means. In the embodiment illustrated, the said second magnetic element is formed by a third and fourth pair of small plates 154, 156, secured on the inner surface of the outer tubular envelope 106$a$ by any appropriate means.

The arrangement of the third and fourth pairs of small plates 154, 156 on the outer tubular envelope 106$a$ reflects the arrangement of the first and second pairs of small plates 155, 157 on the inner tubular envelope 105$a$ of the inner rotor 105 of the first magnetic device 1.

The third and fourth pairs of small plates 154, 156 are permanent magnets made of an appropriate material. The third and fourth pairs of small plates 154, 156 are designed to co-operate with the first and second pairs of small plates 155, 157 respectively. In particular, the magnetic fields generated by the first and third pairs of small plates 155, 154 face in the same direction, which is opposite the direction of the magnetic fields generated by the second and fourth pairs of small plates 157, 156.

According to the arrangement of the pairs of small plates 154, 155, 156, 157 of the inner rotor 105 and of the outer stator 106, starting from its position of rest illustrated in FIG. 8, the first magnetic device 1 regains a stable position of rest at each rotation of 180° of the inner rotor 105. In addition, the maximum torque is generated after a rotation of 45° of the inner rotor 105 relative to the said position of rest of the device. At 90° the torque is zero, and the inner rotor 105 is then in unstable equilibrium. The same finding applies to the third and sixth magnetic devices 3, 6, the arrangement of which is in all points similar to that of the first magnetic device 1.

The inner rotor 105 and the outer stator 106, and in particular the pairs of small plates 154, 155, 156, 157 have dimensions such that:

The torque generated by the return of the inner rotor 105 to a position of rest follows a regular sinusoidal function. The regularity of the function is obtained by varying the dimension of the small plates 154, 155, 156, 157, and in particular their inner and/or outer diameter, or their sector angle. The said regularity of the function also depends on the material of which the rotors are made (soft magnetic material for example).

For a rotation of angle a of the inner rotor 105, the regular sinusoidal function has the form $G_1 \sin(a)$, wherein, in this embodiment, $G_1$ is proportional to ¼ $gm_2 d_5$. In particular, in this embodiment, the regular sinusoidal function has a double period, i.e. a complete rotation of the inner rotor 105 corresponds to two complete periods of the sinusoidal function. It is the arrangement in pairs of the small magnetic plates which makes this possible. The usefulness in this embodiment of having a sinusoidal function with a double period will become apparent hereinafter.

This also applies to the sixth magnetic device 6 which is designed to generate torque, the regular sinusoidal function of which is:

$$G_6 \sin(a)$$

wherein, in this embodiment, $G_6$ is proportional to ¼ $gm_2d_5$.

Figure 7:
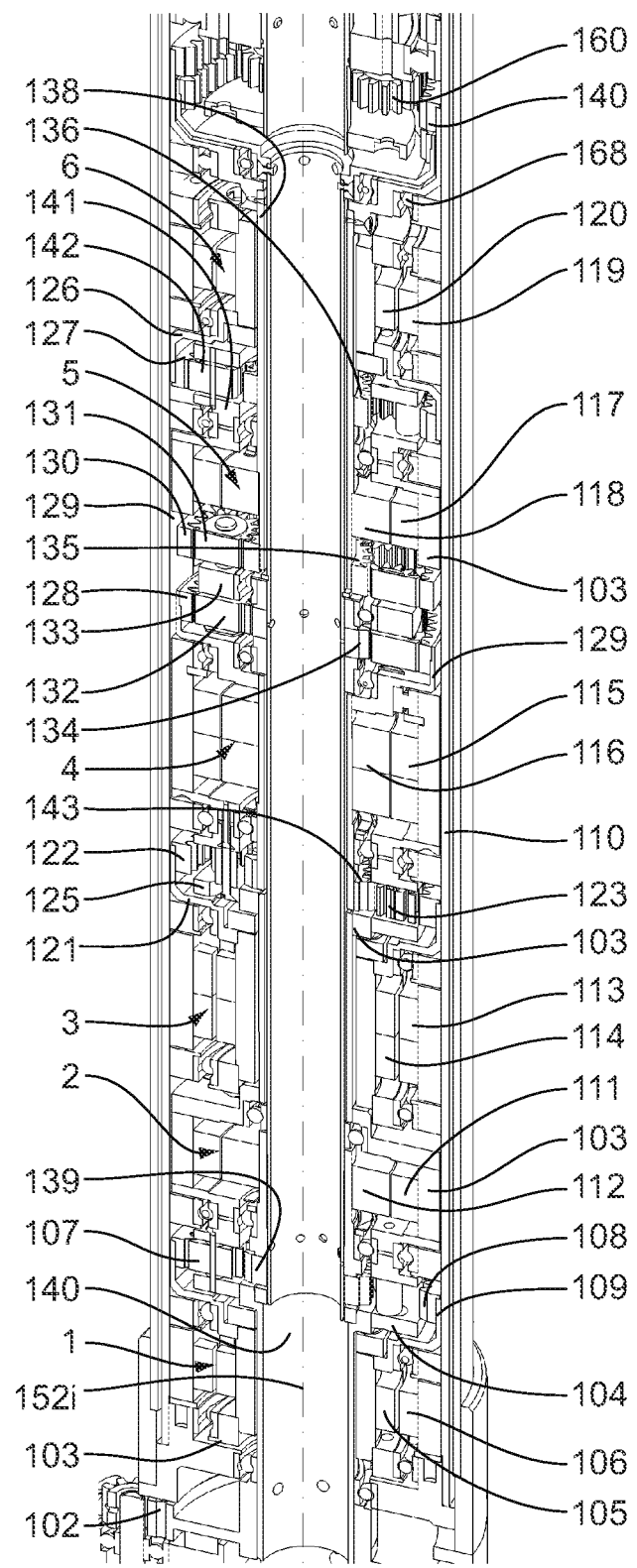
FIG. 7 is a detailed view in cross-section of the device for compensation illustrated in FIG. 6.

As far as the third magnetic device 3 is concerned, the only difference from the first and sixth magnetic devices 1 and 6 consists in the coefficient $G_3$ of the regular sinusoidal function $G_3 \sin(a)$, which describes the torque generated by the third device 3 for a rotation of the inner rotor 113 by an angle a. In fact, the third magnetic device 3 has dimensions such that $G_3$ is proportional to ½ $gm_2d_5$. This difference is illustrated in FIG. 7, in which it can be seen that the third device 3 is twice as wide as the first and sixth magnetic devices 1 and 6.

Figure 9:
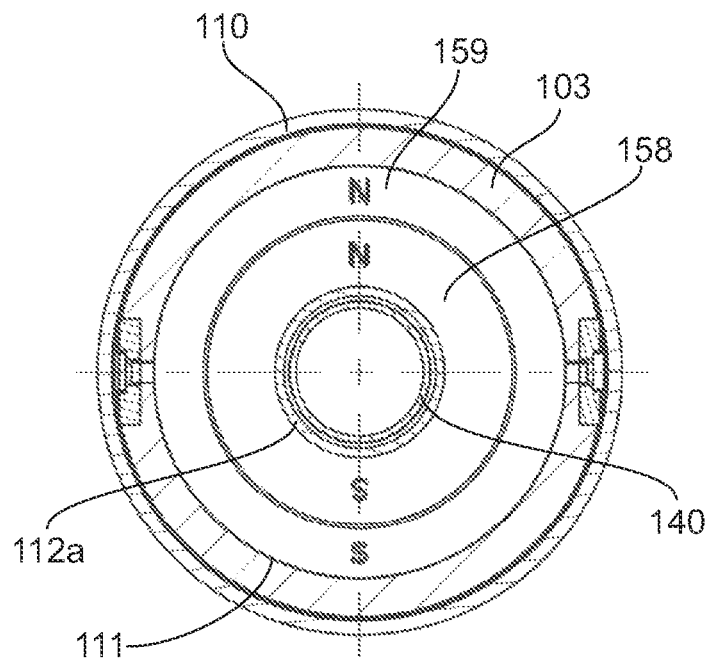

FIG. 9 illustrates in detail the second magnetic device 2 seen in cross-section in a plane perpendicular to the axis of rotation 152*i*. The arrangement of the fourth and fifth magnetic devices 4 and 5 is similar to that of the second magnetic device 2, and will therefore not be described in detail here.

The inner rotor 112 of the second magnetic device 2 is constituted by an inner tubular envelope 112*a*, on which a first magnetic element 158 is secured by any appropriate means. The first magnetic element 158 is a permanent magnet which is made of an appropriate material, and is in the form of a ring which surrounds the inner tubular envelope 112*a*.

Similarly, the outer rotor 111 of the second magnetic device 2 is constituted by an outer tubular envelope 111*a*, on which a second magnetic element 159 is secured by any appropriate means. The second magnetic element 159 is a permanent magnet in the form of a ring placed inside the outer tubular envelope 111*a*.

The first and second magnetic elements 158, 159 are placed in their respective tubular envelope, such that the magnetic field generated by the said small plates extends radially relative to the said tubular envelopes.

According to the arrangement of the elements 158, 159 of the inner rotor 112 and of the outer rotor 111, the second magnetic device 2 regains a stable position of rest at each relative rotation of 360° of the inner rotor 112 in relation to the outer rotor 111, and at a relative rotation of 180° the position of equilibrium is unstable. In addition, the maximum torque generated by the inner and outer rotors 112, 111 in the attempt to regain a position of rest is generated after a relative rotation of 90° of the inner rotor 112 and of the outer rotor 111. The same finding applies to the fourth and fifth magnetic devices 4, 5, the arrangement of which is similar.

The inner rotor 112 and the outer rotor 111, and in particular the first and second magnetic elements 158, 159, have dimensions such that:

The torque generated by the return of the inner rotor 112 and of the outer rotor 111 to a position of rest follows a regular sinusoidal function. The regularity of the function is obtained by modifying the outer and/or inner diameter of the magnetic elements in the form of a ring. The said regularity of the function also depends on the material of which the rotors are made (soft magnetic material for example).

For a relative rotation by an angle a of the inner rotor 112 in relation to the outer rotor 111, the regular sinusoidal function has the form $G_2 \sin(a)$ wherein, in this embodiment, $G_2$ is proportional to ¼ $gm_2d_5$. In particular, in this embodiment, the regular sinusoidal function has a single period, i.e. a complete rotation of the inner rotor 112 relative to the outer rotor 111 corresponds to a complete period of the sinusoidal function.

This also applies to the fifth magnetic device 5 which is designed to generate torque, the regular sinusoidal function of which is:

$$G_5 \sin(a)$$

wherein, in this embodiment, $G_5$ is proportional to ¼ $gm_2d_5$.

As far as the fourth magnetic device 4 is concerned, the only difference from the second and fifth magnetic devices 2 and 5 consists of the coefficient $G_4$ of the regular sinusoidal function $G_4 \sin(a)$ which describes the torque generated by the fourth device 4, for relative rotation of the inner rotor 116 in relation to the outer rotor 117 by an angle a. In fact, in this embodiment, the fourth magnetic device 4 has dimensions such that $G_4$ is proportional to ½ $gm_2d_5$. This difference is illustrated in FIG. 7, in which it can be seen that the fourth magnetic device 4, like the third magnetic device 3, is twice as wide as the first, second, fifth and sixth magnetic devices 1, 2, 5 and 6.

The inner and outer tubular envelopes are preferably made of a soft ferromagnetic alloy in order to loop the magnetic fields generated by the small plates (154, 155, 156, 157, 158, 159) which they support, and to isolate the magnetic devices 1 to 6 from the rest of the device for compensation 150 and from the rest of the articulated mechanical arm 300.

The gears which connect the first, second and third drive shafts 103, 140, 138 to the magnetic devices 1 to 6, as well as the gears which make it possible to transmit the torques generated by the said magnetic devices to the second, third and fourth shafts 151, 152, 153, are described in detail hereinafter with reference to FIGS. 6, 7, 10 and 11.

Figure 6:
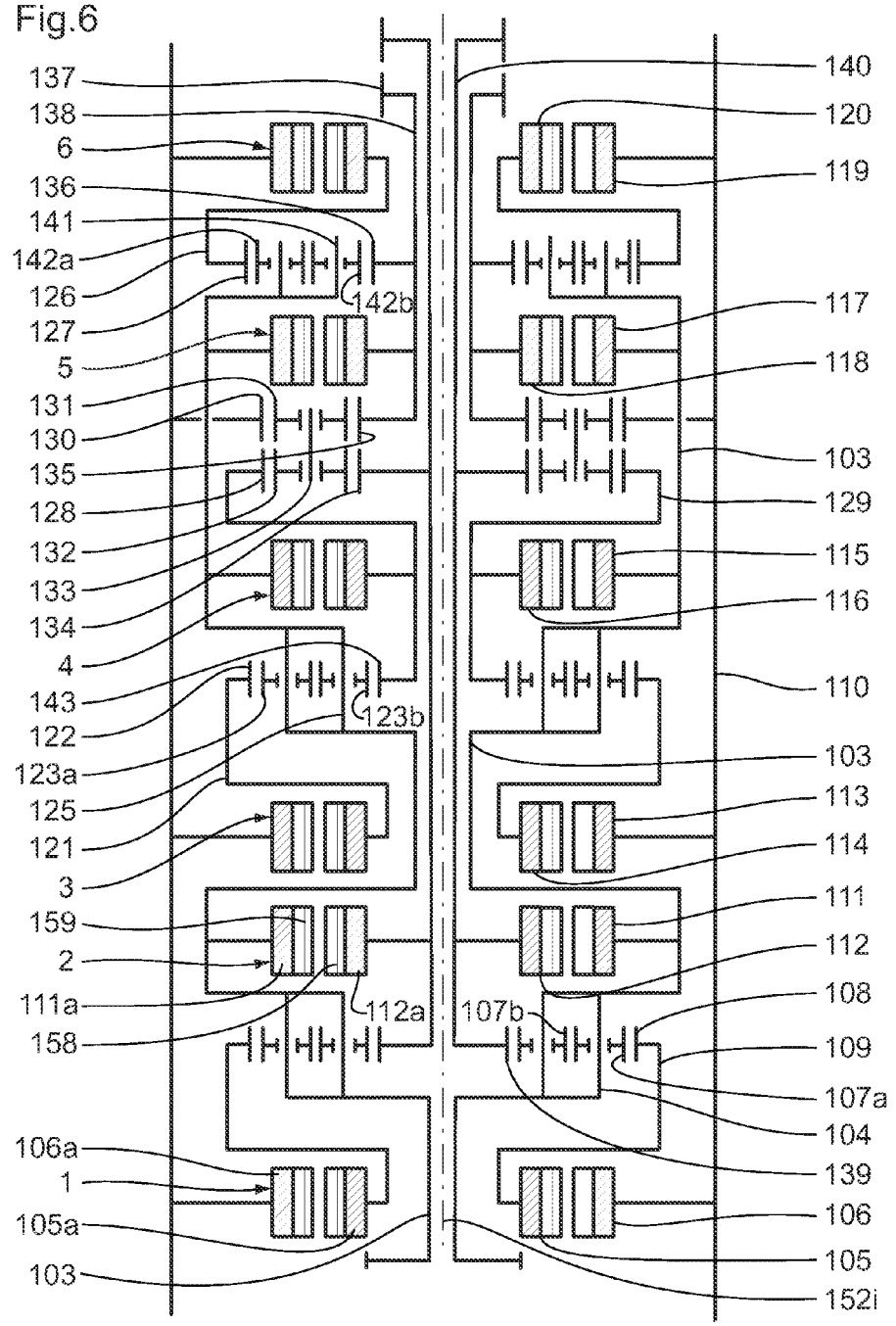
FIG. 6 illustrates schematically the device for compensation according to a preferred embodiment of the invention.
Figure 10:
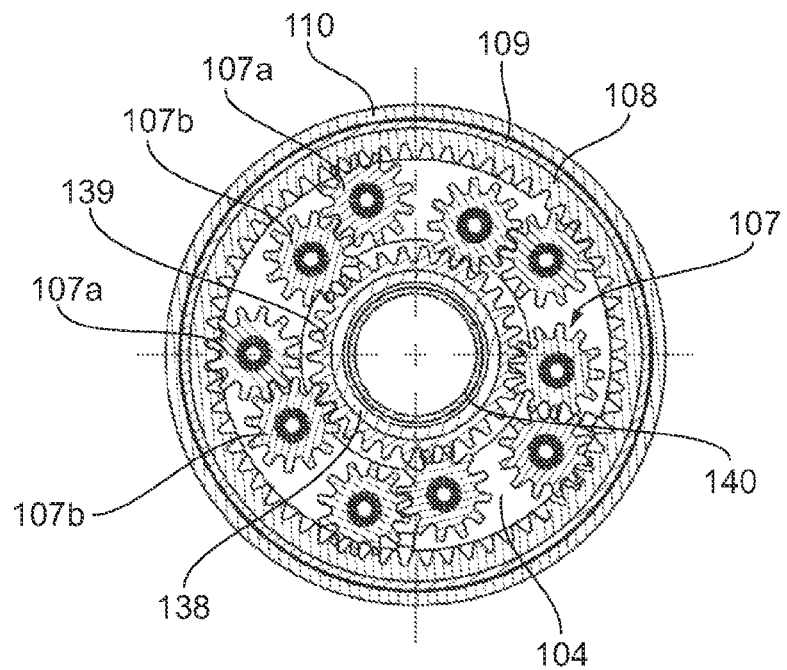
FIGS. 10 and 11 are views in cross-section according to an axis perpendicular to the axis 152$i$ of the device for compensation illustrated in FIG. 6, illustrating respectively an inverse planetary gear, and a simple planetary gear.

In the embodiment illustrated in particular in FIGS. 6 and 10, a first planetary gear holder 104 is fitted integrally with the first drive shaft 103. A first satellite mobile unit 107 is fitted such as to pivot on the said first planetary gear holder 104, parallel to the first drive shaft 103 and to the main axis of rotation 152*i*. The first satellite mobile unit 107 consists of at least one pair of satellite wheels 107*a*, 107*b* which engage with one another. Preferably the first satellite mobile unit 107 consists of five pairs of satellite wheels 107*a*, 107*b*.

A second planetary gear holder 125 is fitted integrally with the first drive shaft 103. A second satellite mobile unit 123 is fitted such as to pivot on the said second planetary gear holder 125, parallel to the first drive shaft 103 and to the main axis of rotation 152*i*. The second satellite mobile unit 123 consists of at least one pair of satellite wheels 123*a*, 123*b* which engage with one another. Preferably, in the embodiment illustrated, the second satellite mobile unit 123 consists of five pairs of satellite wheels 123*a*, 123*b*.

A third planetary gear holder 141 is fitted integrally with the first drive shaft 103. A third satellite mobile unit 142 is fitted such as to pivot on the said third planetary gear holder 141, parallel to the first drive shaft 103 and to the main axis of rotation 152*i*. The third satellite mobile unit 142 consists of at least one pair of satellite wheels 142*a*, 142*b* which engage with one another. Preferably in the embodiment illustrated, the third satellite mobile unit 142 consists of five pairs of satellite wheels 142*a*, 142*b*.

The first drive shaft 103 is also integral with the outer rotors 111, 115, 117 of the second, fourth and fifth magnetic devices 2, 4, 5.

The second drive shaft 140 supports a first sun wheel 139 and a second sun wheel 134. The second drive shaft 140 is also integral with the inner rotor 112 of the second magnetic device 2. The first sun wheel 139 is engaged with the satellite mobile unit 107 which the first drive shaft 103 supports. The said first satellite mobile unit 107 is also engaged with the inner toothing of a first toothed ring 108, which is connected integrally by a first connection element 109 to the inner rotor 105 of the first magnetic device 1. The first planetary gear holder 104, the first satellite mobile unit 107, the first sun wheel 139 and the first toothed ring 108 form a first inverse planetary gear (FIG. 10): in fact, the first satellite mobile unit 107 is designed such that, if it is assumed that the ring 108 is fixed, the directions of rotation of the first sun wheel 139 and of the first planetary gear holder 104 are opposite. The first inverse planetary gear 104, 107, 108, 139 makes it possible to add together the movements of the inputs both of the first sun wheel 139 and of the first planetary gear holder 104 (which is integral with the first drive shaft 103), taking into account a certain gear ratio. In the embodiment illustrated, the output from the first toothed ring 108 is in the ratio of half the addition of the inputs.

Figure 11:
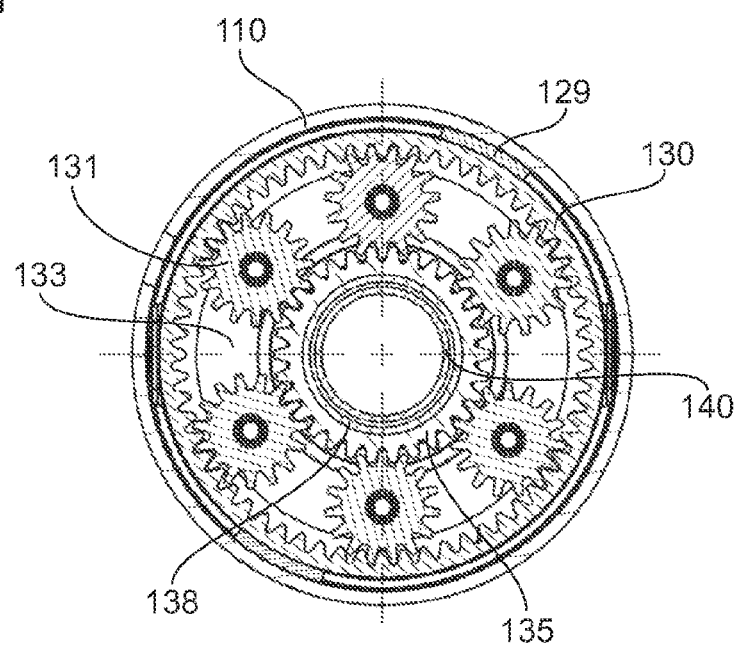

The second sun wheel 134 of the second drive shaft 140 engages with a fourth satellite mobile unit 132 which is supported by a fourth planetary gear holder 133, supported by rotary guides (not illustrated) on the second drive shaft 140. The fourth satellite mobile unit 132 is also engaged with the inner toothing of a second toothed ring 128, which is connected integrally by an appropriate second connection element 129 to the inner rotor 116 of the fourth magnetic device 4. In this embodiment, and as illustrated in FIG. 11, the fourth satellite mobile unit is formed by at least one satellite wheel, and preferably by six satellite wheels 131, each of which is supported by the fourth planetary gear holder 133.

The fourth planetary gear holder 133, the fourth satellite mobile unit 132, the second sun wheel 134 and the second toothed ring 128 form a first simple planetary gear: in fact, the said elements, and in particular the fourth satellite mobile unit 132, are formed such that, if it is assumed that the second toothed ring 128 is fixed, the direction of rotation of the second sun wheel 134 and of the fourth planetary gear holder 133 are the same.

The third drive shaft 138 supports a third and a fourth sun wheel 135, 136. The third drive shaft 138 is also integral with the inner rotor 118 of the fifth magnetic device 5.

The third sun wheel 135 is engaged with a fifth satellite mobile unit 131, which is supported by the fourth planetary gear holder 133. The said fifth satellite mobile unit 131 also engages with the inner toothing of a third toothed ring 130, which is fixed relative to the support 110, and is fitted in the latter by any appropriate means.

The fourth planetary gear holder 133, the fifth satellite mobile unit 131, the third sun wheel 135 and the third toothed ring 130 form a second simple planetary gear (without inversion of the direction of rotation between the third sun wheel 135 and the fourth planetary gear holder 133), illustrated in FIG. 11.

The first and second simple planetary gears (133, 132, 134, 128; 133, 131, 135, 130) make it possible to differentiate the movements of the second and third drive shafts 140, 138, in order to extract from them (taking into account a certain gear ratio) the movement specific to the fourth shaft 153 (i.e. the angle $\theta_4$) of the fourth pivot connection 306 at the output from the second toothed ring 128.

In this embodiment, the gear ratio between the second and third toothed rings 128, 130 and the second and third sun wheels 134, 135 is two.

The fourth sun wheel 136 is engaged with the third satellite mobile unit 142 supported by the third planetary gear holder 141 which is integral with the first drive shaft 103. The said third satellite mobile unit 142 is also engaged with the inner toothing of a fourth toothed ring 127 which is connected integrally by an appropriate third connection element 126 to the inner rotor 120 of the sixth magnetic device 6.

The third planetary gear holder 141, the third satellite mobile unit 142, the fourth sun wheel 136 and the fourth toothed ring 127 form a second inverse planetary gear, i.e. the third satellite mobile unit 142 is arranged such that, if it is assumed that the fourth toothed ring 127 is fixed, the direction of rotation of the fourth sun ring 136 is identical to the direction of rotation of the third planetary gear holder 141.

Just as for the first inverse planetary gear (104, 107, 108, 139), the second inverse planetary gear (141, 142, 127, 136) makes it possible to add the movements of the inputs both of the fourth sun wheel 136 and of the third planetary gear holder 141 (which is integral with the first drive shaft 103), whilst taking into account a certain gear ratio. In the embodiment illustrated, the output from the fourth toothed ring 127 is in a ratio of half the addition of the inputs.

Finally, a third inverse planetary gear (with inversion of direction between the fifth sun wheel 143 and the second planetary gear holder 125) is formed by the second planetary gear holder 125 which is integral with the first drive shaft 103, of the second satellite mobile unit 123 which is engaged with a fifth sun wheel 143 and with a fifth toothed ring 122. The fifth sun wheel 143 is connected integrally by the second connection element 129 to the inner rotor 116 of the fourth magnetic device 4 and to the second toothed ring 128. For its part the fifth toothed ring 122 is connected integrally by an appropriate fourth connection element 121 to the inner rotor 114 of the third magnetic device 3.

On the basis of the above considerations concerning the arrangement of the six magnetic devices 1 to 6 and the gear system which forms the device for compensation 150, it is possible to calculate the torques generated by each of the said magnetic devices in the embodiment illustrated.

Thus, the first inverse planetary gear 104, 107, 139, 108 makes it possible to transmit to the inner rotor 105 of the first magnetic device 1 the addition of the rotations of the first and second shafts 103, 140. Since the first drive shaft 103 is designed to transmit to the device for compensation 150 the rotation of the upper arm 304 around the second shaft 151 ($\theta_2$), and the second drive shaft 140 is designed to transmit to the device for compensation 150 the subtraction of the movements of the forearm 307 around the third and fourth shafts 152, 153 ($\theta_3-\theta_4$), any rotation of the said first and second drive shafts 103, 140 gives rise to rotation of the inner rotor 105 relative to the outer stator 106 of the first magnetic device 1 by an angle equal to $t_1(\theta_2+(\theta_3-\theta_4))$, where $t_1$ is a parameter which takes into account the gear ratios, and is equal to ½ in this embodiment. Further to this rotation of the inner rotor 105, the first magnetic device 1 will attempt to regain its position of rest (illustrated in FIG. 8), and will generate torque, the value of which is $$G_1 \sin(\theta_2+(\theta_3-\theta_4)) \approx \tfrac{1}{4} g m_2 d_5 \sin(\theta_2+(\theta_3-\theta_4)).$$

Indeed, in this embodiment, the first magnetic device 1 is designed such that the torque which it generates follows a regular double-period sinusoidal function, in order to take into account the gear ratios of the first inverse planetary gear 104, 107, 108, 139.

The inner rotor 112 of the second magnetic device 2 is integral with the second drive shaft 140, and thus carries out a rotation equal to $\theta_3-\theta_4$. The outer rotor 111 of the second magnetic device 2 is integral with the first drive shaft 103, and thus carries out a rotation equal to $\theta_2$. Thus, the relative rotation of the inner and outer rotors 112, 111 of the second magnetic device 2 is equal to the subtraction $\theta_2-(\theta_3-\theta_4)$. Further to this relative rotation, the inner and outer rotors 112, 111 will attempt to regain their position of rest (illustrated in FIG. 9), and will thus generate torque equal to $$G_2 \sin(\theta_2-\theta_3+\theta_4) \approx \tfrac{1}{4}gm_2d_5 \sin(\theta_2-\theta_3+\theta_4).$$

The first simple planetary gear 133, 134, 132, 128 makes it possible to isolate the rotation around the fourth shaft 153 ($\theta_4$) transmitted by the second drive shaft 140. The third inverse planetary gear (125, 123, 143, 122) makes it possible to add to this rotation around the fourth shaft 153 the rotation around the second shaft 152 ($\theta_2$) transmitted by the first drive shaft 103. Thus, the inner rotor 114 of the third magnetic device 3 carries out a rotation by an angle equal to $t_3(\theta_2+\theta_4)$, where $t_3$ is a parameter which takes into account the gear ratios, and is equal to ½ in this embodiment. Further to this rotation, the inner rotor 114 will attempt to regain its position of rest relative to its outer stator 113, and will consequently generate a torque equal to $$G_3 \sin(\theta_2+\theta_4) \tfrac{1}{2}gm_2d_5 \sin(\theta_2+\theta_4).$$

The same comment as for the first magnetic device 1 applies concerning the ratio between the period of the sinusoidal function which characterises the torque generated by the third magnetic device 3, and the coefficient of the angle of rotation of the inner rotor 114 determined by the gear ratios of the first simple planetary gear and the third inverse planetary gear.

As for the fourth magnetic device 4, the rotation of the inner rotor 116 which is integral with the toothed ring 128 (output from the first simple planetary gear 133, 132, 134, 128) is thus equal to $\theta_4$, whereas the rotation of the outer rotor 115 which is integral with the first drive shaft 103 is thus equal to $\theta_2$. The torque generated by the said fourth magnetic device 4 is thus equal to $$G_4 \sin(\theta_2-\theta_4) \approx \tfrac{1}{2}gm_2d_5 \sin(\theta_2-\theta_4).$$

According to a similar reasoning, the rotation of the inner rotor 118 of the fifth magnetic device 5 which is integral with the third drive shaft 138 is thus equal to $\theta_3+\theta_4$, whereas the rotation of the outer rotor 117 of the said fifth magnetic device 5 which is integral with the first drive shaft 103 is thus equal to $\theta_2$. Thus, the torque generated by the said fifth magnetic device 5 is therefore equal to $$G_5 \sin(\theta_2-\theta_3-\theta_4) \approx \tfrac{1}{4}gm_2d_5 \sin(\theta_2-\theta_3-\theta_4).$$

Finally, the rotation of the inner rotor 120 of the sixth magnetic device is determined by the second inverse planetary gear (141, 142, 136, 127) and corresponds to $t_6(\theta_2+\theta_3+\theta_4)$, where $t_6$ is a parameter which takes into account the gear ratios, and is equal to ½ in this embodiment. The torque generated by the said magnetic device is thus equal to $$G_6 \sin(\theta_2+\theta_3+\theta_4) \approx gm_2d_5 \sin(\theta_2+\theta_3+\theta_4).$$

The same comment as for the first and third magnetic devices 1, 3 applies concerning the ratio between the period of the sinusoidal function which characterises the torque generated by the sixth magnetic device 6 and the coefficient of the angle of rotation of the inner rotor 120 determined by the gear ratios of the second inverse planetary gear.

Thus, any movement of the upper arm 304 and/or of the forearm 307 relative to the second, third and fourth shafts 151, 152, 153 of the second, third and fourth pivot connections 303, 305, 306 drives the six magnetic devices which are designed to generate a torque which is dependent on the said movement (i.e. on the angles $\theta_2$, $\theta_3$, $\theta_4$) and on the physical characteristics of the articulated mechanical arm (mass $m_2$ and distance $d_5$).

Each magnetic device 1 to 6 is thus designed to generate a sine term which constitutes the equations of the counter-torques $C_{303}$, $C_{305}$, $C_{306}$ determined above.

The gear system of the device for compensation according to the present embodiment, and in particular the first, second and third inverse planetary gears and the first and second simple planetary gears are designed to combine the torques generated by the magnetic devices 1 to 6 such as to obtain the counter-torques $C_{303}$, $C_{305}$, $C_{306}$ calculated above, and to transmit these counter-torques to the second, third and fourth shafts 151, 152, 153 of the second, third and fourth pivot connections 303, 305, 306, via the first, second and third drive shafts 103, 140, 138 respectively.

Thus, irrespective of the position of the upper arm 304 and the forearm 307 relative to the second, third and fourth pivot connections 303, 305, 306, the effects of gravity on the said pivot connections are compensated for, and the equilibrium of the articulated mechanical arm 300 is maintained.

The articulated mechanical arm 300 and the device for compensation 150 according to the embodiment illustrated has been described above purely by way of example, and it will be clearly apparent that modifications and adjustments are possible without departing from the scope of the present invention.

It is evident in particular that the first shaft 320 and the first axis of rotation 320*i* of the first pivot connection 302 need not be vertical. In this case, the effects of gravity would also be exerted on this pivot connection, which effects could be compensated for by the device for compensation according to the invention by means of some evident modifications or by another known devices.

It is also apparent that this first pivot connection 302 could be eliminated.

Similarly, as a variant, the moment of force caused by the gravity which is exerted on the second shaft 151 of the second pivot connection 303 could be entirely compensated for by means of a passive device for compensation such as described above. For this purpose, it is sufficient to add a seventh magnetic device designed to generate torque, the function of which is a regular sinusoid with the form $G_7 \sin(a)$, where $G_7$ is proportional to $(m_1d_3+m_2d_2)$, and to modify the transmission system in order to transmit to the said magnetic device any rotation of the articulated mechanical arm around the second pivot connection 303 (i.e. the value of $\theta_2$). These modifications are within the scope of persons skilled in the art.

In general, an articulated mechanical arm according to the invention has at least one articulation to be compensated for which articulates a first element of the said arm (base, upper arm, forearm) on a second element of the said arm (upper arm, forearm, "hand" or tool holder) and corresponding to a degree of freedom of the said arm. The articulated arm comprises a device for compensation for gravity according to the invention which is designed to compensate for the effects of gravity on the said articulation to be compensated for. The device for compensation comprises a drive mechanism and a mechanism for generation of torque. The mechanism for generation of torque comprises at least one magnetic device which is of the rotor/stator type, with a magnetic inner element which pivots in an outer magnetic element, and is designed such that the rotation of one element relative to the other gives rise to the production of torque caused by the magnetic device regaining its position of rest. As demonstrated above in a particular case, the minimum number of magnetic devices is determined as follows:

The moment of force exerted by gravity on the articulation is calculated. This moment depends on the properties of the articulated mechanical arm, i.e. the mass, number of articulations, position of the articulated mechanical arm relative to the other articulations (for example, in the embodiment illustrated, the position of the mechanical arm, and in particular of the tool holder 310 relative to the fifth and sixth pivot connections 308, 309, does not have any effect on the moment of force caused by the gravity exerted on the second, third and fourth pivot connections 303, 305, 306).

By means of the usual trigonometric formulae, the moment of force calculated above is transformed such as to have only terms constituted by the sine function with the form c sin(a), where c is a constant which is dependent in particular on the mass and on the terrestrial gravitational constant g, and where a is an angle which depends on the position of the articulated mechanical arm and its members relative to the articulations of the said arm.

The number of these sine terms is the minimum number of magnetic devices which the mechanism for generation of torque of the device for compensation must comprise.

It is apparent that this therefore provides a minimum number, and that more magnetic devices could be used. The resulting modifications will be clearly apparent to persons skilled in the art.

Each of the magnetic devices is thus designed such that the torque it produces follows a regular sinusoidal function with the form C sin (p β) where C is a constant, p is a whole period and β is an angle. As explained above, the size and arrangement of the magnetic devices depend on the size and mass of the arm and also on the gear mechanism.

For its part, the drive mechanism of the device for compensation is designed to transmit to the magnetic device(s) the rotations of the articulated mechanical arm around the articulation to be compensated for and its other articulations which would have an effect on the said articulation to be compensated for. These rotations will drive the magnetic devices which will then produce a particular torque. The drive mechanism is also designed to combine and return these particular torques to the articulation to be compensated for, such that the total torque thus transmitted cancels the moment of force caused by the gravity which is exerted on the said articulation to be compensated for.

The present invention is thus generalised to an articulated arm with a single, or two or three or more articulations to be compensated for, to an articulated arm such as that described above, for which certain articulations do not have any effect on the other articulations, the position of the arm relative to these articulations not giving rise to modification of its centre of gravity for example.

The drive mechanism can be a mechanism with toothed wheels as described above with reference to the preferred embodiment, or any other appropriate mechanism.

In view of the nature of the device for compensation, during the fitting of the articulated mechanical arm according to the invention, it is necessary to take into account the position of the said arm and its members relative to its articulations: for example, in order to obtain the embodiment described above, the fitting position of the articulated mechanical arm 300 corresponds to precise values of $\theta_2$. $\theta_3$, $\theta_4$. Consequently, it is necessary to "charge" the six magnetic devices 1 to 6 by placing them in a position which corresponds to the said precise values $\theta_3$, $\theta_3$, $\theta_4$, and then assemble the arm and the device for compensation. For example, for the first magnetic device 1, it is necessary to rotate the inner rotor 105 relative to the outer stator 106 by an angle corresponding to $(\theta_2+\theta_3-\theta_4)/2$, ½ being the gear ratio.

Any type of magnetic device can be used: thus, magnets which have a Halbach structure could be appropriate depending on the size of the system.

An articulated mechanical arm according to the invention comprising a passive device for compensation as described above has many advantages. Since it is passive, it does not require a source of energy in order to function. It is not cumbersome, but is reliable and precise. In addition, it is suitable for any type and any size of articulated mechanical arm, since it is sufficient to adjust the magnetic devices and the gear mechanism accordingly, depending on the size, mass or number of the pivot connections (degree of freedom of the said arm) to be compensated for.

The invention claimed is:

1. Articulated mechanical arm (300) comprising a passive device for compensation for gravity (150), which is designed to compensate for the effects of gravity on at least a first pivot connection (305) which articulates a first member (304) of the said arm on a second member (307) of the said arm, and constitutes a first degree of freedom of the said arm, characterised in that the said passive device for compensation for gravity (150) comprises a drive mechanism and at least one magnetic device, the drive mechanism being designed to transmit to the magnetic device any rotation of the second member (307) relative to the said first pivot connection, the magnetic device being designed to produce torque further to the said rotation of the second member, the drive mechanism and the magnetic device also being designed such that the said torque is retransmitted by the drive mechanism to the first pivot connection, such that the said retransmitted torque cancels the moment of force caused by the gravity which is exerted on the articulated mechanical arm, relative to the said first pivot connection, and in that the device for compensation (150) is designed to compensate for the effects of gravity on a second connection (306) which articulates the first member on the second member, and forms a second degree of freedom of the said arm, and on a third pivot connection (303) which articulates a third member of the arm (301) on the first member (304), and constitutes a third degree of freedom of the said arm, the device for compensation comprising a minimum number of magnetic devices, the said minimum number corresponding to the number of distinct sine terms which form the equations of the moment of force exerted by gravity on each of the first, second and third pivot connections once these equations are transformed to contain only sine terms, the drive mechanism being designed to transmit to each of the magnetic devices any rotation of the first, second and third members of the arm relative to the first, second and third pivot connections, the magnetic devices each being designed to produce further to these rotations a torque, the function of which is a regular sinusoid, the drive mechanism and the magnetic devices also being designed to transmit to each of the first, second and third pivot connections a corresponding counter-torque, which is the combination of the torques generated by the magnetic devices, and such that the said corresponding counter-torque cancels the moment of force caused by gravity on the first, second and third pivot connections respectively.

2. Mechanical arm according to claim 1, characterised in that each magnetic device comprises at least a first rotor which pivots relative to a stator or to a second rotor.

3. Articulated mechanical arm (300) comprising a passive device for compensation for gravity (150), which is designed to compensate for the effects of gravity on at least a first pivot connection (305) which articulates a first member (304) of the said arm on a second member (307) of the said arm, and constitutes a first degree of freedom of the said arm, characterised in that the said passive device for compensation for gravity (150) comprises a drive mechanism and at least one magnetic device, the drive mechanism being designed to transmit to the magnetic device any rotation of the second member (307) relative to the said first pivot connection, the magnetic device being designed to produce torque further to the said rotation of the second member, the drive mechanism and the magnetic device also being designed such that the said torque is retransmitted by the drive mechanism to the first pivot connection, such that the said retransmitted torque cancels the moment of force caused by the gravity which is exerted on the articulated mechanical arm, relative to the said first pivot connection, wherein each magnetic device comprises at least a first rotor which pivots relative to a stator or to a second rotor and wherein the first rotor and the second rotor or stator comprise each at least one permanent magnet, and wherein said passive device for compensation for gravity does not require a source of energy in order to function.

4. Articulated mechanical arm according to claim 3, characterised in that each magnetic device is designed such that, further to the rotation of the first rotor relative to the second rotor or stator, the return of the first rotor to its position of rest relative to the second rotor or stator generates torque, the function of which is a regular sinusoid.

5. Articulated mechanical arm according to claim 4, characterised in that the passive device for compensation for gravity (150) is accommodated in a support (110) which forms part of the upper arm (304).

6. Articulated mechanical arm according to claim 4, characterised in that the first rotor, second rotor or stator comprise a tubular envelope, on which at least one permanent magnetic element is secured.

7. Articulated mechanical arm according to claim 6, characterised in that the passive device for compensation for gravity (150) is accommodated in a support (110) which forms part of the upper arm (304).

8. Articulated mechanical arm according to claim 3, characterised in that the first rotor, second rotor or stator comprise a tubular envelope, on which at least one permanent magnetic element is secured.

9. Articulated mechanical arm according to claim 8, characterised in that the passive device for compensation for gravity (150) is accommodated in a support (110) which forms part of the upper arm (304).

10. Articulated mechanical arm according to claim 3, characterised in that the passive device for compensation for gravity (150) is accommodated in a support (110) which forms part of the upper arm (304).

11. Articulated mechanical arm according to claim 3, characterised in that the device for compensation (150) is designed to compensate for the effects of gravity on a second connection (306) which articulates the first member on the second member, and forms a second degree of freedom of the said arm, and on a third pivot connection (303) which articulates a third member of the arm (301) on the first member (304), and constitutes a third degree of freedom of the said arm, the device for compensation comprising a minimum number of magnetic devices, the said minimum number corresponding to the number of distinct sine terms which form the equations of the moment of force exerted by gravity on each of the first, second and third pivot connections once these equations are transformed to contain only sine terms, the drive mechanism being designed to transmit to each of the magnetic devices any rotation of the first, second and third members of the arm relative to the first, second and third pivot connections, the magnetic devices each being designed to produce further to these rotations a torque, the function of which is a regular sinusoid, the drive mechanism and the magnetic devices also being designed to transmit to each of the first, second and third pivot connections a corresponding counter-torque, which is the combination of the torques generated by the magnetic devices, and such that the said corresponding counter-torque cancels the moment of force caused by gravity on the first, second and third pivot connections respectively.

12. Articulated mechanical arm according to claim 11, characterised in that the passive device for compensation for gravity (150) is accommodated in a support (110) which forms part of the upper arm (304).

\* \* \* \* \*